United States Patent
Isaksson et al.

(10) Patent No.: US 7,113,549 B1
(45) Date of Patent: Sep. 26, 2006

(54) IN, OR RELATING TO, VDSL

(75) Inventors: Mikael Isaksson, Luleå (SE); Daniel Bengtsson, Luleå (SE); Frank Sjöberg, Luleå (SE); Per Ödling, Luleå (SE); Rickard Nilsson, Luleå (SE); Gunnar Bahlenberg, Luleå (SE); Magnus Johansson, Luleå (SE); Lennart Olsson, Luleå (SE); Göran Ökvist, Luleå (SE)

(73) Assignee: STMicroelectronics NV, Amsterdam (NL)

( * ) Notice: Subject to any disclaimer, the term of this patent is extended or adjusted under 35 U.S.C. 154(b) by 0 days.

(21) Appl. No.: 09/622,523

(22) PCT Filed: Feb. 17, 1999

(86) PCT No.: PCT/SE99/00210

§ 371 (c)(1),
(2), (4) Date: Dec. 7, 2000

(87) PCT Pub. No.: WO99/43123

PCT Pub. Date: Aug. 26, 1999

(30) Foreign Application Priority Data

Feb. 21, 1998 (SE) .............................................. 9800539
Apr. 1, 1998 (SE) .............................................. 9801150

(51) Int. Cl.
*H04B 15/00* (2006.01)

(52) U.S. Cl. ....................... 375/285; 375/296; 375/346; 375/222; 375/257

(58) Field of Classification Search ................. 375/219, 375/222, 285, 284, 278, 345, 346, 257, 296; 370/210, 208, 203
See application file for complete search history.

(56) References Cited

U.S. PATENT DOCUMENTS 5,357,502 A * 10/1994 Castelain et al. ........... 370/210
5,668,802 A   9/1997 Chalmers et al.

(Continued)

FOREIGN PATENT DOCUMENTS

| EP | 0802649 | 10/1997 |
| WO | WO 9641458 | 12/1996 |
| WO | WO 9704572 | 2/1997 |

OTHER PUBLICATIONS

IEEE Transaction on Broadcasting, vol. 41, No. 1, Mar. 1995, William Y. Nou et al., CORDM: An Overview.

(Continued)

*Primary Examiner*—Phoung Phu
(74) *Attorney, Agent, or Firm*—Lisa K. Jorgenson; James H. Morris; Wolf, Greenfield & Sacks, P.C.

(57) ABSTRACT

Zipper is the time-synchronized frequency-division duplex implementation of discrete multi-tone (DMT) modulation. Two communicating Zipper modems transmit DMT symbols simultaneously with a common clock. When all transmitters are time synchronized, the near end cross-talk (NEXT) and near end echoes injected into the received signal are orthogonal to the desired signal. The present invention provides a telecommunications transmission system using zipper and having at least two VDSL systems. Each VDSL system comprises a pair of zipper modems communicating over a cable transmission path. The telecommunications transmission system handles zipper transmission transmitted over the common cable; at least partly mitigates NEXT; and permits transmissions in a first VDSL system which are asynchronous with transmissions in a second VDSL system.

46 Claims, 9 Drawing Sheets

U.S. PATENT DOCUMENTS

| | | | |
|---|---|---|---|
| 5,673,290 A | | 9/1997 | Cioffi |
| 5,790,516 A | | 8/1998 | Gudmundson et al. |
| 6,035,000 A | * | 3/2000 | Bingham .................... 375/296 |
| 6,393,051 B1 | * | 5/2002 | Koizumi et al. ............ 375/220 |
| 6,404,830 B1 | * | 6/2002 | Wiese et al. ................ 375/346 |

OTHER PUBLICATIONS

Rumdfunktech Mitteilung, vol. 40, No. 3, Mar. 1996, Claus Muschallik, Zeitfensterung Eines OFDM–Signal zur Verbesserung des Storabstands Im Empfanger.

IEEE Global Telecommunications Conference, vol. 1, Dec. 1994, Anders Vahline et al., Optimal Finite Duration Pulses for ORDM.

IEEE International Conference on Communications, vol. 2, May 1993, (Geneva), Minnie Ho et al., High–Speed Full–Duplex Cancellation for Discrete Multitone Modualtion.

* cited by examiner

IN, OR RELATING TO, VDSL

FIELD OF THE INVENTION

The present invention relates to a method of using VDSL zipper duplex transmission in an unsynchronised mode, a system employing VDSL zipper duplex transmission, in an unsynchronised mode, over a common twisted pair cable, a transmission system employing the method, a receiver for use with the transmission system, a transmitter for use with the transmission system and a modem, incorporating a receiver and transmitter, for use with the transmission system.

BACKGROUND OF THE INVENTION

In our co-pending patent application WO 9706619, there is described a procedure for suppressing near-end crosstalk (NEXT) when using duplex communication, in twisted pair wire networks, in which different subcarriers are used in the two transmission directions, and in which the subcarriers are orthogonal. Preferably a number of sub-carriers are transmitted in each transmission direction. Alternate sub-carriers are used in each direction. The number of sub-carriers used in one transmission direction may be greater than the number used in the other transmission direction.

In our co-pending patent application, referenced above, the use of Zipper VDSL with time synchronization is described. The present invention complements the earlier invention, in that it enables VDSL Zipper duplex transmission, as described in our co-pending patent application, without time synchronization between different modem pairs over the same twisted copper pair cable, i.e. in the same binder group.

Zipper is a time-synchronized frequency division duplex implementation of discrete multi tone (DMT) modulation. Two communicating Zipper modems transmit DMT symbols simultaneously with a common clock. The Zipper scheme implies that every carrier, in the total set of carriers in the DMT signal, is exclusively chosen to be used for either for the upstream, or the down-stream, direction. When all transmitters are time synchronized, the near end crosstalk (NEXT) and near end echoes, injected into the received signal, are orthogonal to the desired signal. To ensure the orthogonality between the signal and all the noise sources originating from DMT signals in the opposite direction, the guard time, with cyclic extension of the symbols between consecutive symbols, must be dimensioned for the maximum propagation delay of the channel. Further, the size of the guard time is minimised by applying timing advance.

Several duplex VDSL systems may share the same twisted pair copper cable. Such systems are referred to as belonging to the same binder group. VDSL systems, using Zipper, which belong to the same binder group, are affected by line attenuation, near end echo and crosstalk. In known Zipper transmission systems, when timing advance is used, all transceivers, in a binding group, start the transmission of each frame at the same time.

There are three types of signal that affect the length of the cyclic extension in each frame:
the received signal;
the echo signal caused by imperfect balance of the hybrid and impedance discontinuities in the line; and
the NEXT signal.

Orthogonality, between the received signal, the echo signal and the NEXT signal, is preserved if each sampled DMT symbol is disturbed by a single frame from each one of the near-end transmitters. Because of this, in order to preserve orthogonality, the cyclic extension has to be dimensioned to cover all impulse responses from the line, the echoes and the NEXT.

SUMMARY OF THE INVENTION

However, in certain situations it may be difficult, for practical reasons, or otherwise undesirable, to provide and maintain time synchronization between all transmitters in the same binder group. It is therefore desirable to enable Zipper modems, if necessary, to operate in a non-synchronized mode. In other words, only pairwise synchronisation is maintained between a VTU-O and VTU-R pair. The present invention provides this option for Zipper modems and systems employing Zipper modems. Thus, the present invention permits different users to transmit time asynchronous DMT frames in the same binder group. However, although this is always possible, a noticeable performance penalty can be expected in many situations because of increased NEXT. One way in which the present invention mitigates increased NEXT is by pulse shaping of DMT frames prior to transmission and providing additional pulse shaping at the receiver. Using pulse shaping at the transmitter has the additional advantage of higher suppression of the side lobes of the DMT spectrum. This increases spectral compatibility with other systems, such as, ADSL and CAP-VDSL.

According to a first aspect of the present invention, there is provided a telecommunications transmission system using zipper having at least two VDSL systems, each comprising a pair of zipper modems, said at least two VDSL systems belonging to a binder group common to both VDSL systems, characterised in that said telecommunications transmission system is adapted to:

handle zipper transmissions transmitted in said binder group;
at least partly mitigate NEXT; and
permit transmissions in a first VDSL system which are asynchronous with transmissions in at least a second VDSL system.

DMT frames may be pulse shaped prior to transmission.
Said pulse shaping may produces an improved suppression of side lobes of said DMT's spectrum.

A cyclic extension may be added to DMT symbols, said cyclic extension comprising:
a suffix which is greater than, or equal to, a channel's propagation delay; and
a prefix which is greater than, or equal to, a guard time needed to eliminate inter-symbol interference.

Said pulse shaping may be produced by forming pulse shaped wings on a DMT frame in cyclic extensions of the DMT frame.

Said pulse shaped wings may be in the form of a raised cosine pulse.

Said pulse shaping may be performed at a transmitter, after addition of a cyclic prefix and cyclic suffix, to a symbol and prior to digital to analogue conversion.

A DMT signal received by a receiver may be windowed to further reduce NEXT.

Said windowing may be performed by:
multiplying $\mu$ samples at the beginning and end of a block of $2N+\mu$ samples;
folding and adding $\mu/2$ samples from the beginning of the $2N+\mu$ block of samples to the end of the 2N remaining samples; and folding and adding μ/2 samples from the end of the 2N+μ block of samples to the beginning of the 2N remaining samples.

The same number of subcarriers may be used for transmission in the up stream direction as are used for transmission in the down stream direction.

A different number of sub-carriers may be used for transmission in the up stream and down stream directions.

According to a second aspect of the present invention, there may be provided, in a telecommunications transmission system using zipper and having at least two VDSL systems, each comprising a pair of zipper modems, said at least two VDSL systems belonging to a single binder group common to both VDSL systems, a method of transmission characterised by permitting zipper transmissions of said first and, at least, said second VDSL transmission systems, to be transmitted in said single binder group, where transmission in said first VDSL system are asynchronous with zipper transmission in said second VDSL system and in which the effects of NEXT are, at least partly, mitigated.

DMT frames may be pulse shaped prior to transmission.

Said pulse shaping may produce an improved suppression of side lobes of said DMTs spectrum.

A cyclic extension may be added to DMT symbols, said cyclic extension comprising:
  a suffix which is greater than, or equal to, a channel's propagation delay; and
  a prefix which is greater than, or equal to, a guard time needed to eliminate inter-symbol interference.

Pulse shaped wings may be formed on a DMT frame in the cyclic extensions of the DMT frame.

Said pulse shaped wings may be formed as a raised cosine pulse.

Said pulse shaping may be performed at a transmitter after addition of a cyclic extension to a symbol and prior to digital to analogue conversion.

A DMT signal received by a receiver may be windowed to further reduce NEXT.

The following steps may be used to perform said windowing:
  multiplying μ samples at the beginning and end of a block of 2N+μ samples;
  folding and adding μ/2 samples from the beginning of the 2N+μ block of samples to the end of the 2N remaining samples; and
  folding and adding μ/2 samples from the end of the 2N+μ block of samples to the beginning of the 2N remaining samples.

The same number of sub-carriers may be transmitted in both an upstream and down stream direction.

A different number of sub-carriers transmited in the up stream and down stream directions.

According to a third aspect of the present invention, there is provided a transmitter, for use in a transmission system as set forth in any preceding paragraph, characterised in that said transmitter comprises an a b-bit buffer and encoder for receiving an input bit stream at a rate of R bit/s, a n-point IDFT processor for receiving an output from said b-bit buffer and encoder, extension means for adding a cyclic extension to an output of said IDFT processor, a pulse shaper for shaping a DMT symbol output from said extension means, and a digital to analogue converter and low pass filter for converting a DMT symbol received from said pulse shaper to analogue form and passing said DMT to a transmission channel.

Said pulse shaper may form pulse shaped wings on said DMT symbol as raised cosine pulses.

According to a fourth aspect of the present invention, there is provided a receiver, for use in a transmission system as set forth in any preceding paragraph, characterised in that said receiver includes an analogue to digital converter for digitising a DMT symbol received from a transmission channel, a windowing unit connected to an output of said analogue to digital converter, a stripper unit for removing cyclic extensions to said DMT symbol, an n-point DFT processor for receiving an output from said stripper unit, a frequency domain equalisation unit for receiving an output from said n-point DFT unit and decoder, and a b-bit buffer for receiving an output from said frequency domain equalisation unit and outputting a bit stream at R bit/s.

Said windowing unit may perform the following operations:
  multiplying μ samples at the beginning and end of a block of 2N+μ samples;
  folding and adding μ/2 samples from the beginning of the 2N+μ block of samples to the end of the 2N remaining samples; and
  folding and adding μ/2 samples from the end of the 2N+μ block of samples to the beginning of the 2N remaining samples.

According to a fifth aspect of the present invention, there is provided a modem, for use in a transmission system as set forth in any preceding paragraph, characterised in that said modem includes a transmitter as set forth in any preceding paragraph.

Said modem may include a receiver, as set forth in any preceding paragraph.

Embodiments of the invention will now be described, by way of example, with reference to the accompanying drawings, in which:

DETAILED DESCRIPTION

To fully appreciate the operation of the present invention it is necessary to consider the invention disclosed in our earlier co-pending patent application WO 9706619. As previously explained, the present invention enables Zipper to be used in a manner in which VDSL systems operating in the same binder group can operate without mutual synchronisation between each system.

Zipper, as disclosed in our co-pending patent application WO 9706619, is a time-synchronized frequency-division duplex implementation of discrete multi tone (DMT) modulation. Two communicating Zipper modems transmit DMT symbols simultaneously with a common clock. The Zipper scheme implies that every carrier, in the total set of carriers in the DMT signal, is selected for use in either the up-stream, or the down-stream, direction. When all transmitters are time synchronized, the near end cross-talk (NEXT) and near end echoes injected into the received signal, are orthogonal to the desired signal. To ensure that orthogonality is maintained between the signal and all the noise sources, originating from DMT signals in the opposite direction, the guard time with cyclic extension of the symbols, between consecutive symbols, must be dimensioned for the maximum propagation delay of the channel. Further, the size of the guard time is minimized by applying timing advance.

Figure 1:
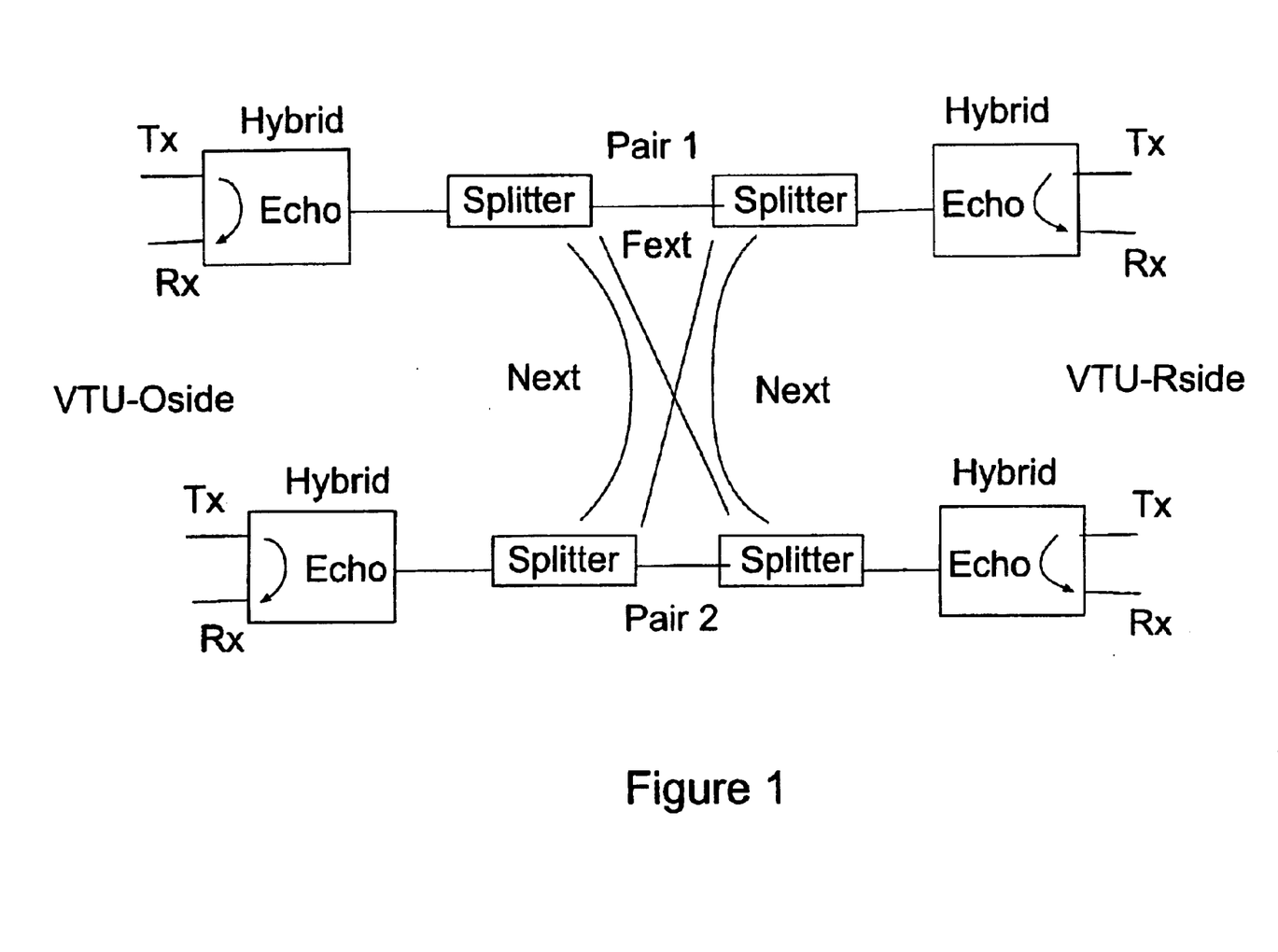
FIG. 1 illustrates the generation of interference signals, cross-talk and echo, that affect the orthogonality of Zipper.

FIG. 1 depicts how two VDSL systems, sharing the same cable, i.e. in the same binder group, are affected by line attenuation, near end echo and cross-talk. Sources of interference that can be identified include:

echo generated within the hybrids and passed from the transmitters to the receivers;

NEXT which passes between the transmitter-receiver pairs at the near end; and

FEXT which passes between the transmitter-receiver pairs at the far end and is transmitted over the full cable length.

Figure 2:
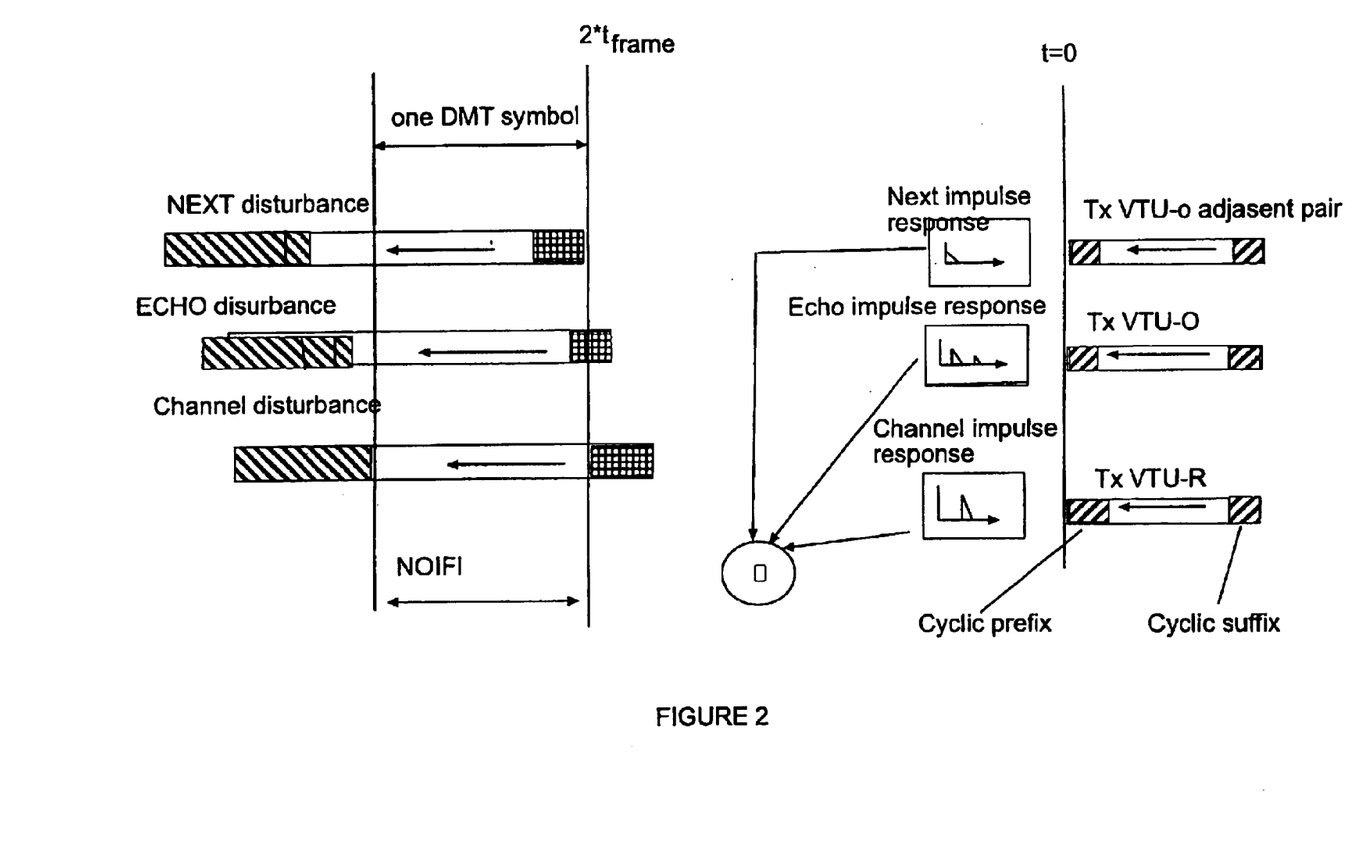
FIG. 2 illustrates sampling, at the VTU-O side, of a received frame disturbed by frames from near end transmitters.

When timing advance is used, all transceivers start the transmission of each frame at the same time. There are three types of signals that affect the length of the cyclic extension in each frame: the received signal, the echo-signal due to imperfect balance of the hybrid and impedance discontinuities in the line, and finally the NEXT signal. FIG. 2 shows sampling at the VTU-O side of received frame disturbed by frames from near-end transmitters.

As can be seen from FIG. 2, the orthogonality between the desired part of the received signal and the disturbances (interference signals) is preserved if each sampled DMT symbol is disturbed by a single frame from each one of the near-end transmitters. As a consequence, to preserve orthogonality, the cyclic extension has to be dimensioned to cover all impulse responses from the line, the echoes, and the NEXT.

The management of the capacity split between up-stream and down-stream is performed by assigning individual carriers for both directions. For example, if a fully symmetric service is required, sub-carriers with even indices can be assigned to the up-stream and sub-carriers with odd indices can be assigned to the down-stream. Similarly, for an asymmetric 8:1 split, each ninth carrier can be assigned to the up-stream and the other carriers assigned to the down-stream. However, for the sake of spectral compatibility with other existing and future systems, operating on the same cable, alternative carrier assignments can be used.

The transmission and reception of symbols is performed simultaneously at both ends by the VTU-O and by the VTU-R. For down-stream transmission the bit stream is encoded by the VTU-O transmitter into a set of quadrature amplitude modulated (QAM) sub-symbols, where each QAM sub-symbol represents a number of bits determined by the signal-to-noise ratio (SNR) of its associated down-stream sub-channel, the desired overall error probability, and the target bit rate. The set of sub-symbols is then input, as a block, to a complex-to-real discrete Fourier transform (IDFT) processor, see FIG. 3. Following the IDFT, a cyclic prefix is added to the output samples to eliminate intersymbol interference, and a cyclic suffix is appended to the output samples to maintain orthogonality between the desired signal and near-end distorting signals. The result is then converted from digital to analog format and applied to the channel.

Figure 3:
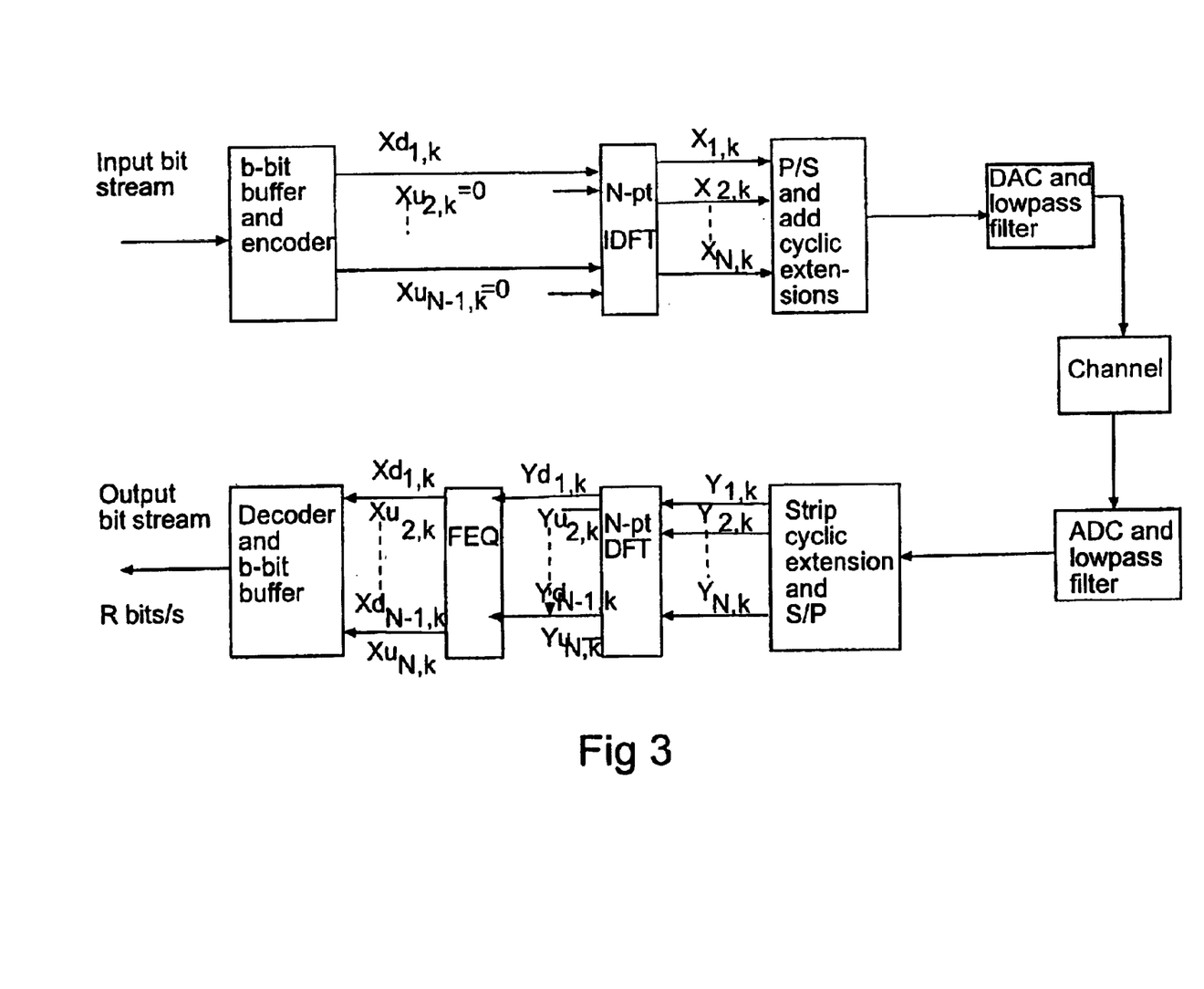
FIG. 3 illustrates a DMT transmitter/receiver pair for down-stream transmission, exemplifying symmetric communication where every second sub-carrier is used, respectively, for the up (u), and down-stream (d), directions.

Thus, the input bit stream, see FIG. 3, enters a b-bit buffer and encoder, from which its is passed to the N-point IDFT processor and thence to the cyclic extension adder. Following which the signal is passed via the DAC and lowpass filter to the channel.

At the VTU-R receiver, after analog-to-digital conversion, the cyclic prefix and suffix are stripped, and the samples are transformed back to the frequency domain by a DFT. Each output value used for down-stream transmission is then scaled by a single complex number to compensate for the magnitude and the phase of each down-stream sub-channel's attenuation, and a detector decodes the resulting symbols. The multiplication with this set of complex numbers, one per down-stream sub-channel, is called frequency-domain equalization (FEQ). FIG. 3 shows a block diagram of a DMT transmitter and receiver pair, assuming a noiseless channel.

In the steady-state, the subchannel SNRs are monitored in a data-driven manner by the VTU-R during down-stream symbol periods, and the bit distribution is modified, as necessary, at the VTU-O, to optimize system performance. Upon detecting a degradation, or improvement, in one, or more, sub-channel SNRs, the VTU-R computes a modified bit distribution that better meets the desired error performance. Depending on the SNR of a degraded sub-channel, some, or all, of its bits may be moved, via a bit swap algorithm, to one, or more, other sub-channels that can support additional bits. The bit distribution change is reported to the VTU-O, where it is implemented.

For up-stream transmission, the roles of the VTU-O and VTU-R are reversed, that is, transmission and reception are performed on the up-stream set of sub-channels and the operations described above are the same.

The frequency range from zero to 11.04 MHZ is partitioned into 2,048 sub-channels. The Nyquist carrier (sub-channel 2,048) and the dc carrier (sub-channel 0) are not be used for data.

Transmission may occur on up to 2047 sub-carriers, although those sub-carriers overlapping the POTS, ISDN, and amateur radio frequency bands are typically not used in the default configuration. The lowest sub-channel available to support data transmission is dependent on the POTS/ISDN splitter design.

The frame format for Zipper comprises two parts, namely:
the DMT symbol; and
the cyclic extension.

Orthogonality is maintained between the received signal and interfering DMT signals transmitted in the opposite direction, if they are sufficiently aligned in time. This requirement is fulfilled by the addition of a cyclic extension to the DMT symbol and the use of timing advance (TA). For the ease of description, the cyclic extension can be divided into a cyclic prefix and a cyclic suffix, where:

the suffix is greater than, or equal to, the propagation delay of the channel; and the prefix is greater than, or equal to, the guard time needed to eliminate inter-symbol interference.

Figure 4:
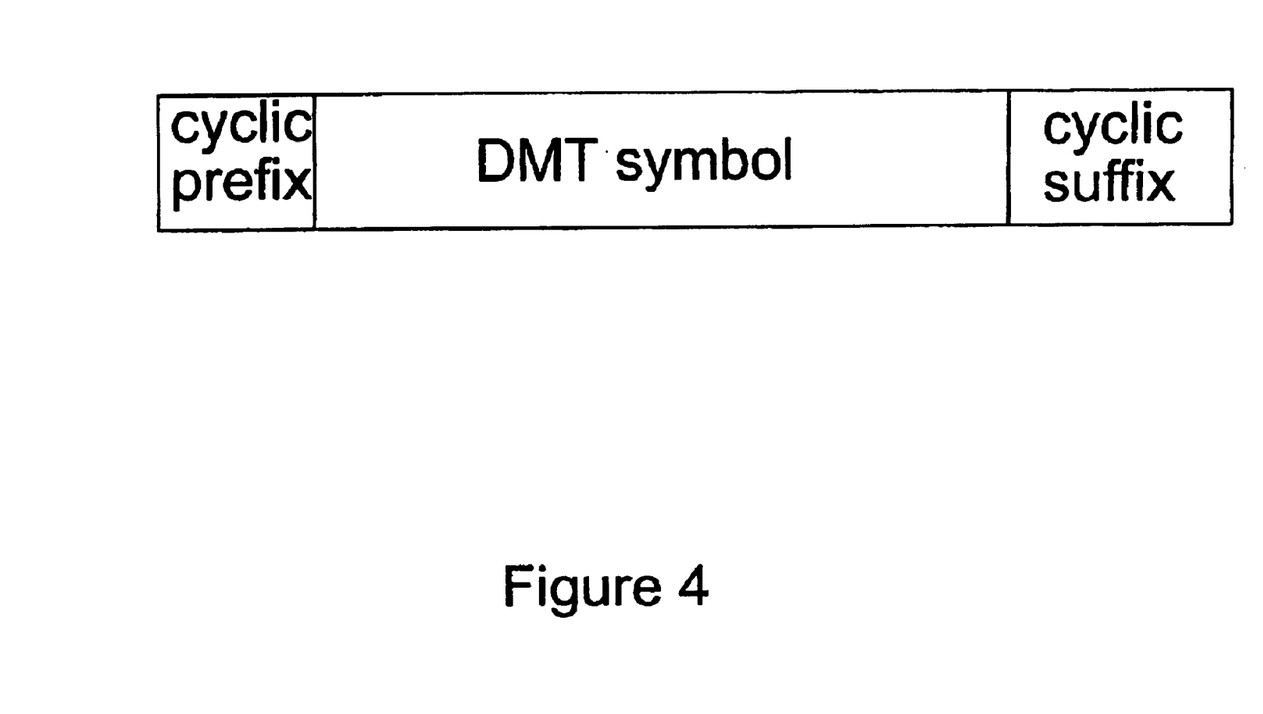
FIG. 4 illustrates the frame format for zipper.

FIG. 4 illustrates the frame format for zipper.

When timing advance is used all transmitters commence transmission at the same time. The suffix part of the cyclic extension can be treated as an extra guard time required to maintain orthogonality between the up and down-stream channels along the wire line. To fulfil the orthogonality requirement at the receiver, the cyclic extension (prefix+ suffix) must also cover the impulse response of the NEXT and the echo signal.

The first $L_{cs}$ samples of the IDFT output are appended to the block of 4096 time-domain samples $x_k$. The last $L_{cp}$ samples of the IDFT output are prepended to the block. The frame of samples is then read out to the digital-to-analog converter (DAC), see FIG. 3, in sequence. That is, the subscripts k of the DAC samples in the sequence are $(4096-L_{cp}), \ldots, 4095, 0, 1, \ldots 4094, 0, 1, \ldots (L_{cs}-1)$.

The length of the cyclic extension ($L_{cp}$ and $L_{cs}$) is typically a programmable entity set by the network operator.

In order to maximize high duplex efficiency, timing advance can be used so that the VTU-O transmitters and the VTU-R transmitters start transmitting each DMT frame at the same time. During the reception, a DMT symbol is only disturbed by single symbols, not affected by IFI, in the other direction due to the cyclic extension.

Zipper is a duplexing scheme based on the Discrete Multitone Modulation (DMT) line-coding technique and was invented at Telia Research in 1995. A patent application, SE 952775 (corresponding to WO9706619) was filed on 4$^{th}$ August 1995.

In certain situations, it may be difficult for practical reasons, or it may be undesirable, to provide and maintain time synchronization between all transmitters in the same binder group. It is therefore desirable to provide an option for Zipper modems which enables them to operate in a non-synchronized mode, where only pairwise synchronization is maintained between a VTU-O and VTU-R pair. Thus, the present invention allows different users to transmit time-asynchronous DMT frames in the same binder group. However, although this is always possible, a noticeable performance penalty, due to increased NEXT, is to be expected in many situations. One possible method of mitigating this is to use pulse shaping of the DMT frames prior to transmission and additional pulse shaping in the receiver. The use of pulse shaping at the transmitter results in a higher suppression of the side lobes of the DMT signal spectrum and gives higher spectral compatibility with other systems, for example, ADSL and CAP-VDSL.

Figure 5:
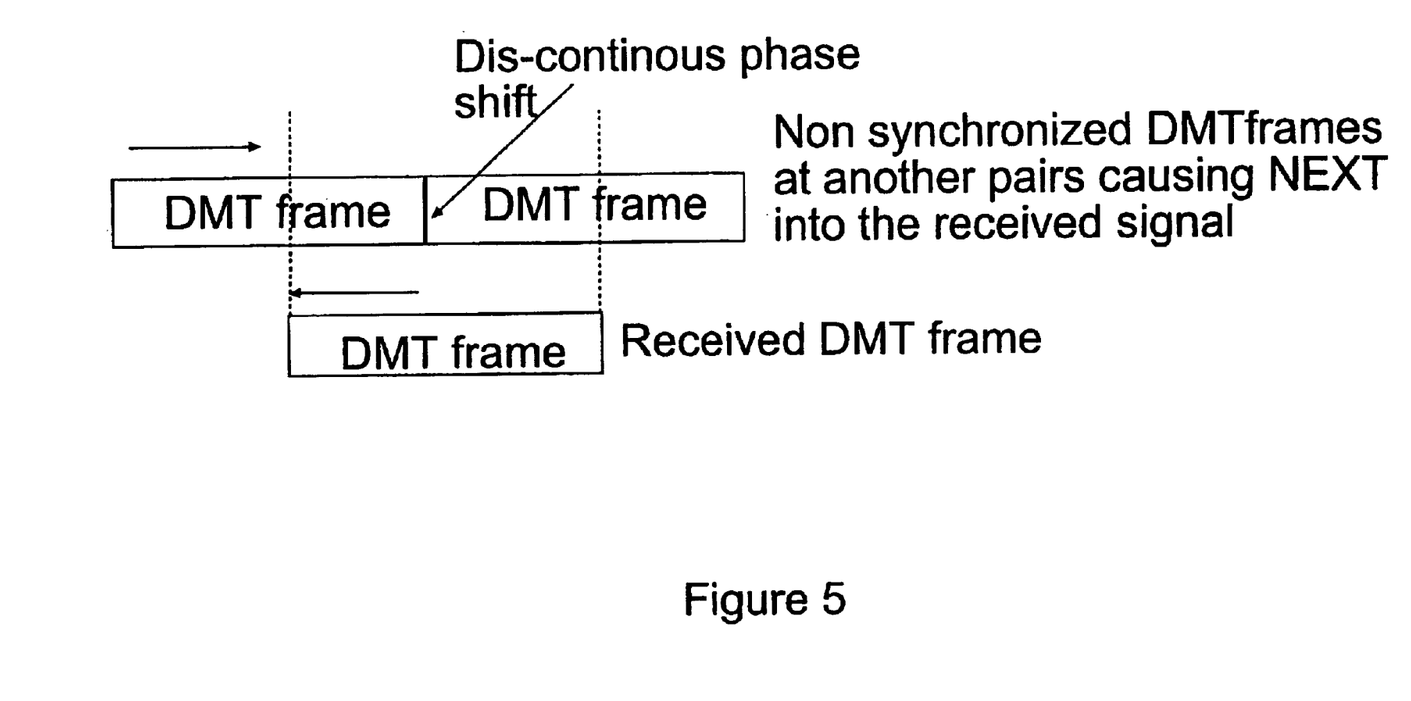
FIG. 5 illustrates non-orthogonal NEXT.

When different pairs of transceivers (modems) operating in the same binder group are asynchronous, interference from NEXT will be introduced, because, the NEXT becomes non-orthogonal and therefore degrades the performance. The reason for the NEXT becoming non-orthogonal is that the received and sampled DMT frame will include NEXT from two consecutive DMT frames which are discontinuous, as depicted in FIG. 5.

In order to be able to operate in a non-synchronized mode it is necessary to suppress the NEXT by narrowing its out-of-band spectrum which interferes with the spectrum of the received signal. This can be effected by pulse shaping the DMT frame before transmission.

Figure 6:
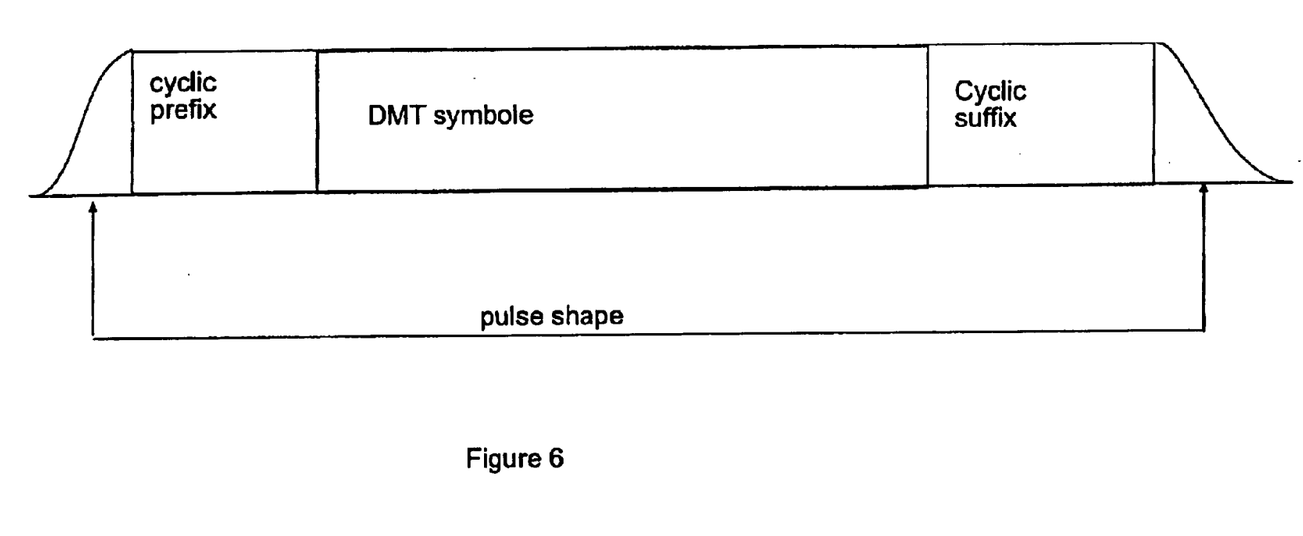
FIG. 6 illustrates pulse shaping of the DMT frame.

Pulse shaping a DMT frame is performed by forming pulse-shaped wings, e.g. from a raised cosine pulse, in the cyclic extensions of the frame as shown in FIG. 6.

With pulse shaping a continuous phase is created between succeeding frames which suppresses the NEXT-interfering subcarriers' side lobes.

Figure 7:
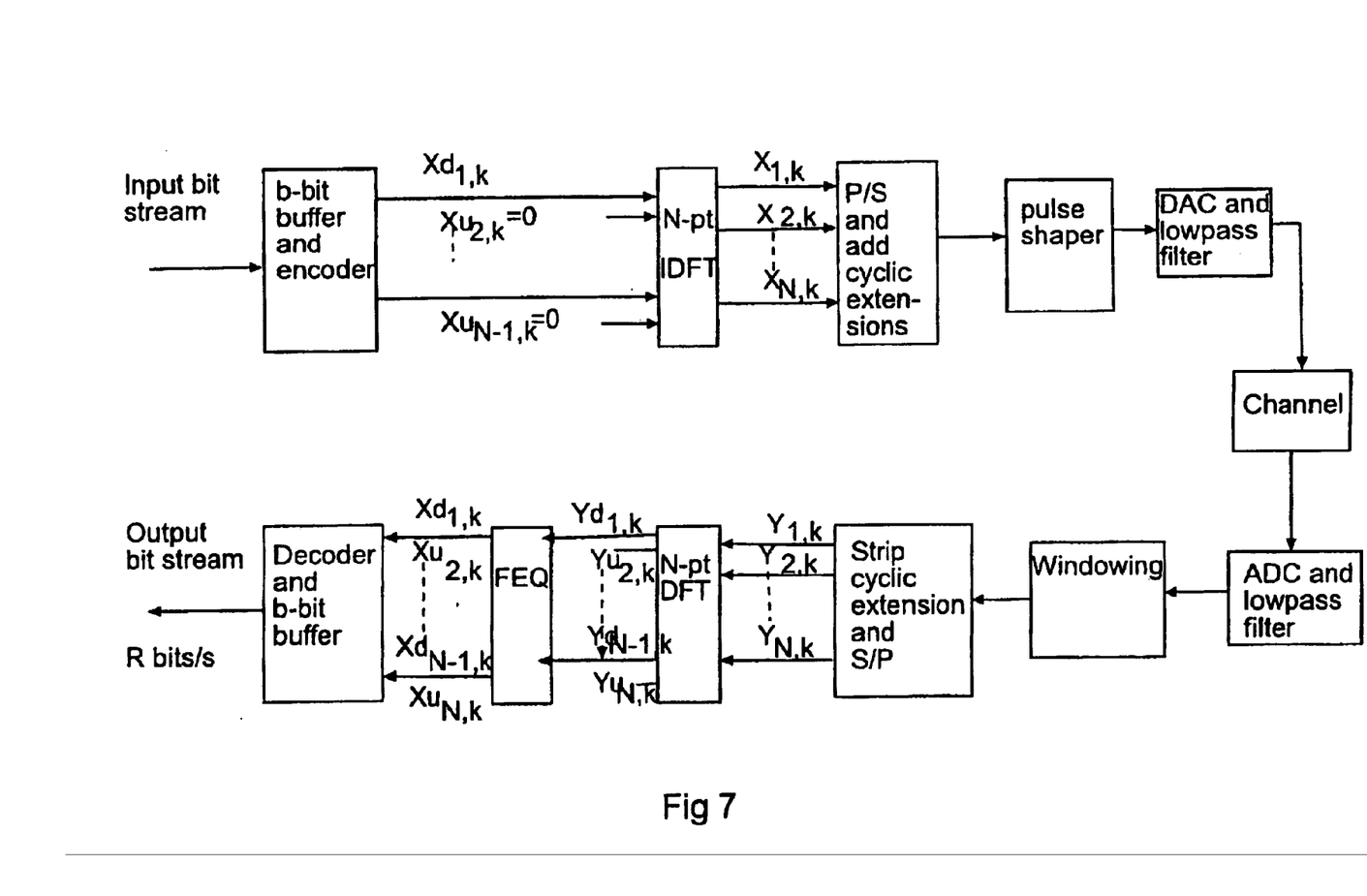
FIG. 7 is a schematic illustration of the pulse shaping process in the transmitter and the windowing process in the receiver.

The pulse shaping operation is performed at the transmitter after the cyclic extension is added to the symbol and before the digital to analog conversion (DAC) is performed. The position of the pulse shaping unit is depicted in FIG. 7 which shows a block diagram of a transceiver/modem according to the present invention. The construction and operation of a VDSL modem will be immediately apparent to those skilled in the art from, FIG. 7, without further explanation. However, for the sake of completeness a brief description of FIG. 7 is set out below.

The transmitter arm of the modem is shown at the top of FIG. 7. The input bit stream, at Rbits/s, is passed to a n-bit buffer and encoder from whence a parallel signal, $Xd_{1,\,k}$, $Xu_{2,\,k}=0 \ldots Xd_{N-1,\,k}, Xu_{N,\,k}=0$, is passed to an n-point IDFT processor. The output from the IDFT processor, $x_{1,\,k}, X_{2,\,k} \ldots X_{N,\,k}$, is then passed to a unit, P/S, where the cyclic extensions, both prefix and suffix, are added to the DMT symbol. The DMT symbol with cyclic extensions then passes to a pulse shaping unit where the pulse is shaped as described above. The DMT symbol is then passed to a digital to analogue convertor and low pass filter and thence to the transmission channel.

The receiver arm of the modem is shown at the bottom of FIG. 7. An incoming signal from the channel is first passed, via a low pass filter and analogue to digital convertor, to a windowing unit, see below for further details. The symbols are then passed to a stripper unit which strips off the cyclic extensions, both prefix and suffix, and thence, as a signal $y_{1,\,k}, y_{2,\,k} \ldots y_{N,\,k}$, to a n-point DFT processor. The signal, $Yd_{1,\,k}, Yu_{2,\,k} \ldots Yd_{N-1,\,k}, Yu_{n,k}$, is then passed to a frequency domain equaliser, FEQ, see the description of FIG. 3, and thence to a decoder and n-bit buffer, as a signal $Xd_{1,\,k}$, $XU_{2,\,k} \ldots Xd_{N-1,\,k}, XU_{N,\,k}$, which outputs the received data stream at R bits/s.

Figure 8:
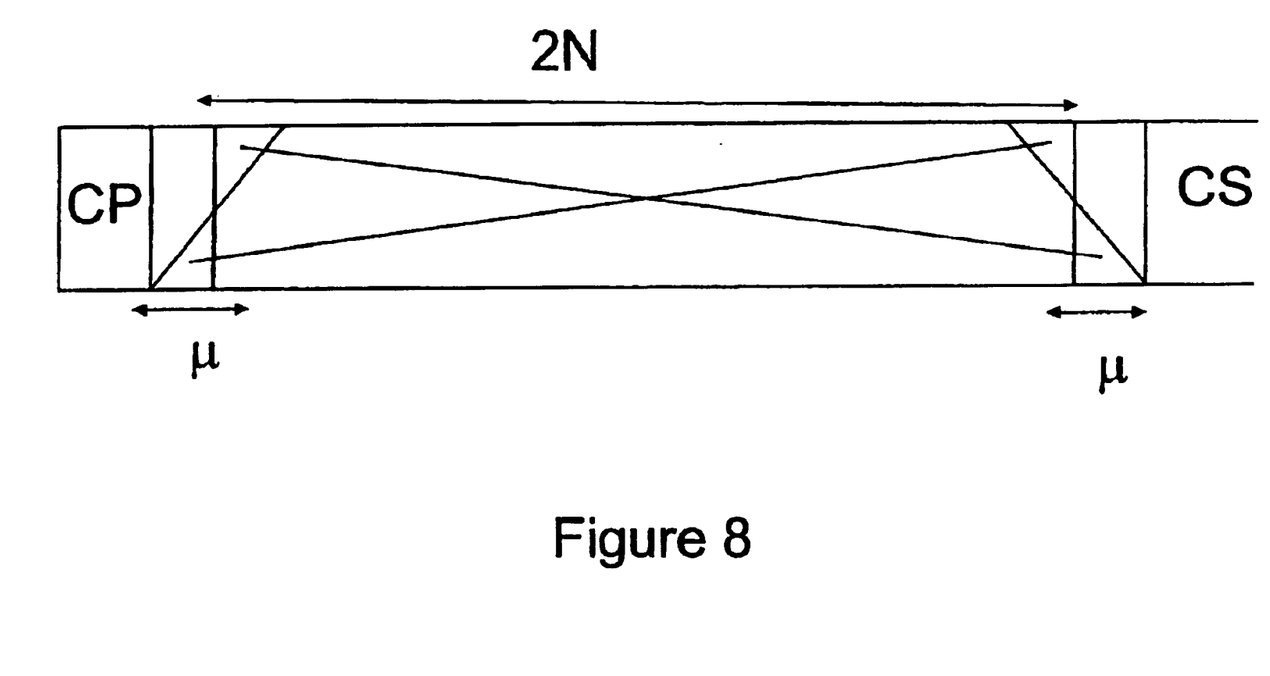
FIG. 8 illustrates windowing of a received DMT frame.

Windowing the received DMT frame, as shown in FIG. 8, further suppresses the non-orthogonal NEXT. The windowing is performed by multiplying $\mu$ samples, at both the beginning and end of the 2N+$\mu$ block of samples. The $\mu/2$ samples from both ends are folded and added to the 2N remaining block of samples at the opposite ends as shown in FIG. 8. As with the pulse shaping of the DMT frames in the transmitter, the windowing in the receiver creates a continuous phase of the non orthogonal NEXT signals. The positioning of the windowing is shown in FIG. 8.

Figure 9:
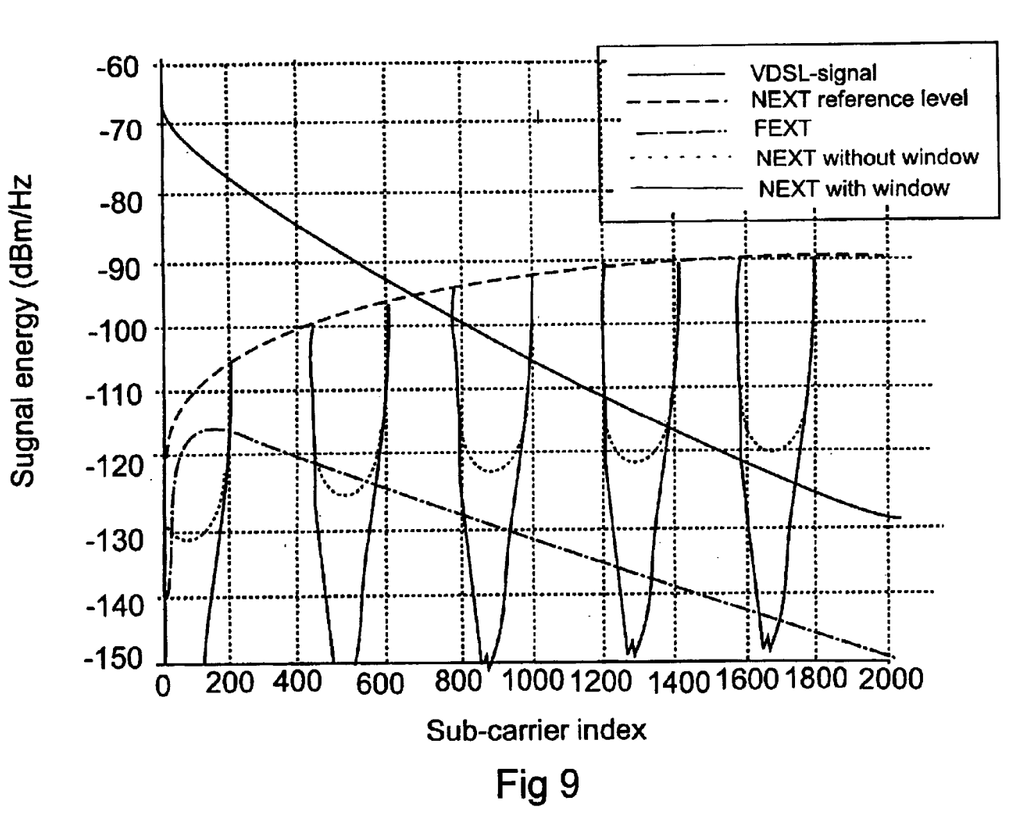
FIG. 9 illustrates asynchronous non-orthogonal NEXT with and without windowing and pulse shaping.

FIG. 9 shows the combined effect, on the non-orthogonal NEXT, of pulse shaping the DMT-frame in the transmitter and windowing the received frame in the receiver. FIG. 9 also shows the signal energy, the NEXT reference signal without pulse-shaping and windowing, the NEXT signal after pulse-shaping and windowing and the FEXT signal at each sub-carrier. As seen in the figure, more than 25 dBm/Hz further suppression can be obtained by both pulse shaping and windowing.

What is claimed is:

1. A telecommunications transmission system having at least two VDSL systems, each comprising a pair of modems, said at least two VDSL systems belonging to a binder group common to the at least two VDSL systems, wherein a transmitter in a first modem in the pair of modems including:
   a extension means (P/S) for cyclic extension of a DMT-symbol by way of adding a prefix or a suffix, and
   a pulse shaper means, adapted to pulse shape sidelobes of a cyclic extended DMT-symbol;

wherein said cyclic extension further comprises:
a suffix which is greater than, or equal to, a channel's propagation delay; and
a prefix which is greater than, or equal to, a guard time needed to eliminate inter-symbol interference.

2. A telecommunications system, as claimed in claim 1, wherein said pair of modems are Zippermodems.

3. A telecommunications system as claimed in claim 1, wherein said pulsed shaped sidelobes are in the form of a raised cosine pulse.

4. A telecommunications system, as claimed in claim 1, wherein the same number of sub-carriers are used for transmission in an up stresam direction as are used for transmission in a down stream direction.

5. A telecommunications system, as claimed in claim 1, wherein a different number of sub-carriers are used for transmission in an up stream and a down stream directions.

6. A telecommunications system, as claimed in claim 1, wherein said transmitter comprises a b-bit buffer and encoder for receiving an input bit stream at a rate of R bit/s, an n-point IDFT processor for receiving an output from said b-bit buffer and encoder, extension means for adding a cyclic extension to an output of said IDFT processor, a pulse shaper for shaping a DMT symbol output from said extension means, and a digital to analog converter and low pass filter for converting a DMT symbol received from said pulse shaper to analog form and passing said DMT to a transmission channel.

7. A telecommunications system, as claimed in claim 1, comprising a receiver that includes an analog to digital converter for digitizing a DMT symbol received from a transmission channel, a windowing unit connected to an output of said analog to digital converter, a stripper unit for removing cyclic extensions to said DMT symbol, an n-point DFT processor for receiving and output from said stripper unit, a frequency doman equalization unit for receiving an output from said n-point DFT unit and decoder, and a b-bit buffer for receiving an output from said frequency domain equalization unit and outputting a bit stream at R bit/s.

8. A modem for use in a transmission system wherein said moden includes a transmitter as claimed in claim 6.

9. A modem for use in a transmission system, wherein said modem includes a receiver as claimed in claim 7.

10. A method in a telecommunication system having at least two VDSL systems adapted to asynchronously transmit DMT-symbols between modems; each of the at least two VDSL systems comprising a pair of modems, said at least two VDSL systems belonging to a binder group common to both VDSL systems, comprising the steps of:

in a transmitter in a first modem in a pair of modems
cyclic extend a DMT-symbol by way of adding a prefix and a suffix;
pulse shaping side lobes of the cyclic extended DMT-symbol;
transmit the cyclic extended and pulse shaped DMT-symbol to a transmission channel;
and in a receiver in a second modem in the pair of modems
windowing the DMT-symbol which transmits on the transmission channel by way of multiplying a first number of samples at the beginning and end of a block of 2N plus the first number of samples, wherein 2N defines a second number of a samples in the DMT symbol; folding and adding the first number of samples divided by two from the beginning of the block to the end of the 2N remaining samples; and folding and adding the first number of samples divided by two from the end of the block to the beginning of the 2N remaining samples, and removing said cyclic extension from a DMT-symbol.

11. A method, as claimed in claim 10 further comprising adding a cyclic extension to DMT symbols, said cyclic extension comprising:
a suffix which is greater than, or equal to, a channel's propagation delay; and
a prefix which is greater than, or equal to, a guard time needed to eliminate inter-symbol interference.

12. A method as claimed in claim 10, further comprising forming said pulse shaped wings as a raised cosine pulse.

13. A method as claimed in claim 10, further comprising performing said pulse shaping at a transmitter after addition of a cyclic extension to a symbol and prior to digital to analog conversion.

14. A method as claimed in claim 11, further comprising transmitting the same number of sub-carriers in both an upstream and a down stream direction.

15. A method as claimed in claim 10, further comprising transmitting a different number of sub-carriers in an up stream and a down stream direction.

16. In a frequency division duplex communication system having a plurality of transmission channels, each transmission channel of the plurality of transmission channels having a plurality of discrete carrier frequencies, a method for processing a frequency domain symbol having a plurality of frequency components, the method comprising:

a) deriving a time domain symbol from the plurality of frequency components of the frequency domain symbol;

b) prior to transmission of the time domain symbol, reducing the frequency content of the time domain symbol so as not to interfere with other symbols on other transmission channels by pulse shaping the time domain symbol to form pulse-shaped wings on the time domain symbol in order to reduce crosstalk in other transmission channels of the plurality of transmission channels;

c) transmitting the time domain symbol on the one of the plurality of transmission channels; and d) after transmission of the time domain symbol, further reducing the frequency content of the time domain symbol so as not to interfere with the other symbols on the other transmission channels by applying a windowing function to the time domain symbol.

17. The method of claim 16, further comprising adding at least one cyclic extension to the time domain symbol before pulse shaping the time domain symbol.

18. The method of claim 17, wherein adding at least one cyclic extension to the time domain symbol further comprises adding at least one of a cyclic prefix and a cyclic suffix to the time domain symbol.

19. The method of claim 17, wherein reducing the frequency content of the time domain symbol further comprises pulse shaping the at least cyclic extension of the time domain symbol.

20. The method of claim 17, wherein reducing the frequency content of the time domain symbol further comprises pulse shaping the time domain symbol using a raised cosine pulse.

21. The method of claim 18, wherein the act of adding at least one of a cyclic prefix and a cyclic suffix to the time domain symbol further comprises adding at least one of a cyclic prefix and cyclic suffix to the time domain symbol, the cyclic prefix having a a length greater than or equal to a guard time needed to eliminate inter-symbol interference and the cyclic suffix having a length greater than or equal to a propagation delay of the transmission channel.

22. The method of claim 17, wherein the act of further reducing th frequency content of the time domain symbol further comprises:

multiplying a first number of samples at the beginning and end of a block of 2 N plus the first number of samples of the time domain symbol wherein a2N defines a second number of samples in the time domain symbol;

folding and adding the first number of samples divided by two from the beginning of the block to the end of the remaining 2N samples of the time domain symbol; and folding and adding the first number samples divided by two from the end of the block to the beginning of the remaining 2N samples of the time domain symbol.

23. In a frequency division duplex communication system having a transmission channel, the transmission channel having a plurality of discrete carrier frequencies, an apparatus for transmitting a frequency domain symbol having a plurality of frequency components, the apparatus comprising:

a) a processor having an input and an output that receives the frequency domain symbol at the input of the processor and generates, based on the plurality of frequency components of the frequency domain symbol, a first time domain symbol at the output of the processor;

b) a pulse shaper having an input and an output that, prior to transmission of the first time domain symbol, receives at the input of the pulse shaper the first time domain symbol and shapes the first time domain symbol to form pulse-shaped wings on the first time domain symbol so as not to interfere with other symbols on other transmission channels in order to generate a second time domain symbol at the output of the pulse shaper;

c) a transmitter having an input and an output that receives the second time domain symbol at the input of the transmitter in order to transmit the second time domain symbol over th transmission channel at the output of the transmitter; and d) a windowing element having an input and an output that, after transmission of the second time domain symbol receives the second time domain symbol at the input of the windowing element and applies a windowing function to the second symbol so as not to interfere with other symbols on other transmission channels in order to generate a third time domain symbol at the output of the windowing element.

24. The apparatus of claim 23, further comprising means for adding at least one cyclic extension to the time domain symbol before pulse shaping the time domain symbol.

25. The apparatus of claim 24, wherein the means for adding at least one cyclic extension to the time domain symbol further comprises means for adding at least one of a cyclic prefix and a cyclic suffix to the time domain symbol.

26. The apparatus of claim 24, wherein the pulse shaper further comprises means for pulse shaping the cyclic extensions of the time domain symbol.

27. The apparatus of claim 24, wherein the pulse shaper further comprises means for pulse shaping the first DMT symbol using a raised cosine pulse.

28. The apparatus of claim 25, wherein the cyclic prefix has a length greater than or equal to a guard time needed to eliminate inter-symbol interference and the cyclic suffix has a length greater than or equal to a propagation delay of the transmission channel.

29. The apparatus of claim 24, wherein the windowing element further comprises:

means for multiplying a first number of samples at the beginning and end of a block of 2N plus the first number of samples of the time domain symbol wherein 2N defines a second number of samples in the time domain symbol;

means for folding and adding the first number of samples divided by two from the beginning of the block to the end of the remaining 2N samples of the time domain symbol; and means for folding and adding the first number of samples divided by two from the end of the block to the beginning of the remaining 2N samples of the time domain symbol.

30. In a frequency division duplex communication system having a transmission channel, the transmission channel having a plurality of discrete carrier frequencies, an apparatus of processing a frequency domain symbol having a plurality of frequency components, the apparatus comprising:

a) means for deriving a time domain symbol from the plurality of frequency components of the frequency domain symbol;

b) prior to transmission of the time domain symbol, means for reducing the frequency content of the time domain symbol so as not to interfere with other symbols on other transmission channels by pulse shaping the time domain symbol to form pulse-shaped wings on the time domain symbol;

c) means for transmitting the time domain symbol on the one of the plurality of transmission channels; and d) after transmission of the time domain symbol, means for further reducing the frequency content of the time domain symbol so as not to interfere with the other symbols on the other transmission channels by applying a windowing function to the time domain symbol.

31. In a frequency division duplex communication system having a transmission channel, the transmission channel having a plurality of discrete carrier frequencies, and a pair of modems, the pair of modems including a first modem located at a first end of the transmission channel and a second modem located at a second end of the transmission channel, a method for transmitting a frequency domain symbol having a plurality of frequency components, the method comprising:

a) deriving a time domain symbol from the plurality of frequency components of the frequency domain symbol;

b) reducing the frequency content of the time domain symbol by pulse shaping the time domain symbol to form pulse-shaped wings on the time domain symbol so as not to interfere with other symbols on other transmission channels prior to transmission of the time domain symbol;

c) using the first modem to transmit the time domain symbol on one of the plurality of carrier frequencies of the transmission channel;

d) using the second modem to receive the time domain symbol on the one of the plurality of carrier frequencies of the transmission channel; and e) after receipt of the time domain symbol further reducing the frequency content of the time domain symbol by applying a windowing function to the time domain symbol so as not to interfere with the other symbols on the other transmission channels.

32. A telecommunications transmission system having at least two VDSL systems, each comprising a pair of modems, said at least two VDSL systems belonging to a binder group common to at least two VDSL systems, wherein a transmitter in a first modem in the pair of modems including:

a extenson means (P/S) for cyclic extension of a DMT-symbol by way of adding a prefix or a suffix, and a pulse shaper means, adapted to pulse shape sidelobes of a cyclic extended DMT-symbol;

wherein said cyclic further comprises:
a suffix which is greater than, or equal to, a channel's propagation delay; and a prefix which is greater than, or equal to, a guard time needed to eliminate inter-symbol interference;
wherein a receiver is a second modem in the pair of modems includes:
windowing means adapted to multiplying a first number of samples at the beginning and end of a block of 2 N plus the first number of samples of DMT symbol, 2 N being the numbe of samples of a non cyclic extended DMT symbol; folding and adding the first number of samples divided by two from the beginning of the bock to the end of the 2 N remaining samples; and folding and adding the first number of samples divided by two from the end of the block to the beginning of the 2 N remaining samples,
a stripping means (s/p) for removing said cyclic extension from a DMT-symbol.

33. A modem in a telecommunications system, comprising:
a receiver adapted to receive from a transmission channel a discrete multitone (DMT) symbol that includes a cyclic extension;
windowing means adapted to multiply a first number of samples at the beginning and end of a block of 2N plus the first number of samples of the DMT symbol, wherein 2N is defined as the number of a samples in a non-cyclic extended DMT symbol; folding and adding the first number of samples divided by two from the beginning of the block to the end of the 2N remaining samples; and folding and adding the first number of samples divided by two from the end of the block to the beginning of the 2N remaining samples; and
stripping means adapted to remove the cyclic extension from the DMT symbol.

34. The modem of claim 33, wherein the cyclic extension includes:
a suffix which is greater than, or equal to, a propagation delay of the transmission channel; and
a prefix which is greater than, or equal to, a guard time needed to eliminate inter-symbol interference.

35. The modem of claim 34, further comprising:
an analog to digital converter for digitizing the DMT symbol;
an n-point DFT processor for receiving an output from the stripper means;
a frequency domain equalization unit for receiving an output from said n-point DFT unit and decoder; and
a b-bit buffer for receiving an output from said frequency domain equalization unit and outputting a bit stream at R bit/s.

36. The modem of claim 33, wherein the transmission channel includes a same number of sub-carriers for transmission in an up stream direction as sub-carriers for transmission in a down stream direction.

37. The modem of claim 33, wherein the transmission channel includes a different number of sub-carriers for transmission in an up stream than sub-carriers for transmission in a down stream direction.

38. A telecommunications system, as claimed in claim 32, wherein said pair of modems are Zippermodems.

39. A telecommunications system as claimed in claim 32, wherein said cyclic extension further comprises:
a suffix which is greater than, or equal to, a channel's propagation delay; and
a prefix which is greater than, or equal to, a guard time needed to eliminate inter-symbol interference.

40. A telecommunications system, as claimed in claim 32, wherein the pulse shaped sidelobes ar in the form of a raised cosine pulse.

41. A telecommunications system, as claim in claim 32, wherein the same number of sub-carriers are used for transmission in an up stream direction as are used for transmission in a down stream direction.

42. A telecommunication system, as claimed in claim 32, wherein a different number of sub-carriers are used for transmission in an up stream and a down stream directions.

43. A telecommunication system, as claim in claim 32, wherein said transmitter comprises a b-bit buffer and encoder for receiving an inpout bit stream at a rate of R bit/s, an n-point IDFT processor for receiving an output from said b-bit buffer and encoder, extension means for adding a cyclic extension to an output of said IDFT processor, a pulse shaper for shaping a DMT symbl output from said extenion means, and a digital to analog converter and low pass filter for covering a DMT symbol received from said pulse shaper to analog form and passing said DMT to a transmission channel.

44. A telecommunication system, as claimed in claim 32, comprises a receiver that includes an analog to digital converter for digitizing a DMT symbol received from a transmission channel, a windowing unit connected to an output of said analog to digital converter, a stripper unit for removing cyclic extensions to said DMT symbol, an an-point DFT processor for receiving an output from said stripper unit, a frequency domain equalization unit for receiving an output from said n-point DFT unit and decoder, and a b-bit buffer for receiving an output from said frequency domain equalization unit and outputting a bit stream at R bit/s.

45. A modem for use in a transmission system, wherein said modem includes a transmitter as claim in claim 43.

46. A modem for use in a transmission system, wherein said modem includes a receiver as claim in claim 44.

* * * * *